Patented Nov. 15, 1938

2,136,946

UNITED STATES PATENT OFFICE 2,136,946

METHOD OF MAKING BEARING STRUCTURES

Frederick T. McCurdy, Kokomo, Ind., assignor, by mesne assignments, to Union Carbide and Carbon Corporation, a corporation of New York No Drawing. Application June 18, 1935, Serial No. 27,160

5 Claims. (Cl. 29—149.5)

The invention relates to bushings, bearings, and the like, the wearing surfaces of which are composed of a wear-resistant alloy. More specifically, the invention pertains to such structures wherein the wearing surface is composed of a difficultly deformable wear-resistant alloy comprising one or more metals of the chromium group with one or more metals of the iron group.

The term "bearings" as used hereinafter will be understood to mean any structure of the general class comprising bushings and bearings.

Wear-resistant alloys of the type herein referred to are described, for example, in Patent Number 1,057,423 issued to Ellwood Haynes. Although the extremely great resistance of such alloys to wear makes their use desirable for certain types of bearings, they are relatively expensive materials, and the cost of making and grinding to shape an entire bearing cast from them is ordinarily prohibitive. Moreover such alloys are difficult to roll or machine, which makes the problem of fabricating them into bearings very difficult. Consequently a cheap and effective method of manufacturing bearings having a wearing surface composed of such alloys would be very useful.

I have found by experimentation that excellent bearings combining the advantages of a wearing surface composed of a hard wear-resistant alloy with the advantages of a body or backing element composed of a relatively soft metal having high physical strength and toughness, can be manufactured by a simple and inexpensive process wherein one face of a relatively thick and substantially flat plate of steel or other suitable backing metal is surfaced by fusion welding with a relatively thin and substantially uniform layer of the wear-resistant alloy. The wear-resistant surface thus formed may then be ground to give a smooth flat surface, after which the composite plate so produced may be heated to a softening temperature, and formed to the desired shape by plastic deformation in a press or other suitable device. The structure thus formed may then be ground accurately to shape with a minimum of effort.

The procedure outlined is preferred, because this sequence of steps usually gives the best combination of overall economy and satisfactory results, but it will be apparent that if desired some of the steps may be omitted without departing from the spirit of the invention.

A wear-resistant alloy well adapted to form the wearing surface of such structures has the following approximate range of usual constituents:

| | Percent |
|---|---|
| Cr | 15 to 35 |
| W, Mo | Up to 20 |
| Mn | Up to 3 |
| Si | Up to 3 |
| C | Up to 3 |
| Co, Ni, Fe | Remainder. | the combined content of nickel and iron being not over about 20%, but the invention is not to be understood as restricted in scope to alloys of this particular composition, for the use of any alloy comprising one or more metals of the chromium group and one or more metals of the iron group, which has suitable physical properties, is within the scope of the invention.

Steel is in general a satisfactory metal for the backing plate used in the manufacture of bearings according to the practice of the invention, but it will be apparent that other metals possessing the required physical and welding properties, as for example "Monel" metal, may likewise be used.

While I prefer to weld the layer of wear-resistant metal onto the backing plate by usual gas or electric welding procedure, I have also found it possible to obtain satisfactory results by placing a sheet of the wear-resistant metal of the desired thickness on the metal backing plate, and causing the two to weld together by simple heating in a muffle furnace, in the presence of a flux, and such method of producing the composite plate is within my invention.

Bearings, bushings and the like, produced in the manner described, hold their shape well, are light in weight, are easily installed, have excellent wearing properties, and can be manufactured at reasonable cost.

I claim:

1. The method of manufacturing bearings, bushings and the like having a wearing or bearing surface composed of a wear-resistant alloy having substantially the hardness, limited forgeability, and limited machinability of the cobalt-chromium-tungsten alloys described herein, which method comprises depositing by fusion welding a layer of such wear-resistant alloy upon one side of a flat and relatively soft metal backing plate; forming the composite plate thus produced, by plastic deformation, to substantially the desired shape; and grinding the wearing or bearing surface to the required smoothness.

2. The method of manufacturing bearings, bushings and the like having a wearing or bearing surface composed of a relatively hard wear-resistant alloy that has the approximate range of composition: 15% to 35% chromium; 2% to 20% metal selected from the group consisting of tungsten and molybdenum; manganese, silicon and carbon in amounts not over about 3% each; the remainder consisting chiefly of metal of the group iron, nickel, cobalt; the combined content of iron and nickel being not over about 20%; which method comprises depositing by fusion welding a layer of said wear-resistant alloy upon one side of a flat and relatively soft metal backing plate, forming by plastic deformation to substantially the desired shape the composite plate thus produced; and grinding the wearing or bearing surface to the required smoothness.

3. The method of manufacturing bearings, bushings and the like having a wearing or bearing surface composed of a relatively hard wear-resistant alloy that has the approximate range of composition: 15% to 35% chromium; 2% to 20% metal selected from the group consisting of tungsten and molybdenum; manganese, silicon and carbon in amounts not over about 3% each; the remainder consisting chiefly of metal of the group iron, nickel, cobalt; the combined content of iron and nickel being not over about 20%; which method comprises depositing by fusion welding a layer of said wear-resistant alloy upon one side of a flat and relatively soft metal backing plate, grinding the wear-resistant alloy surface thus produced to form a flat and substantially smooth surface, and thereafter shaping said composite plate, by plastic deformation, to substantially the desired shape.

4. The method of manufacturing bearings, bushings and the like having a wearing or bearing surface composed of a relatively hard wear-resistant alloy that has the approximate range of composition: 15% to 35% chromium; 2% to 20% metal selected from the group consisting of tungsten and molybdenum; manganese, silicon and carbon in amounts not over about 3% each; the remainder consisting chiefly of metal of the group iron, nickel, cobalt; the combined content of iron and nickel being not over about 20%; which method comprises depositing by fusion welding a layer of said wear-resistant alloy upon one side of a flat and relatively soft metal backing plate, grinding the wear-resistant alloy surface thus produced to form a flat and substantially smooth surface, thereafter heating to a softening temperature the composite plate so produced, and hot forming said composite plate by plastic deformation to substantially the desired shape.

5. The method of manufacturing bearings, bushings and the like having a wearing or bearing surface composed of a relatively hard wear-resistant alloy that has the approximate range of composition: 15% to 35% chromium; 2% to 20% metal selected from the group consisting of tungsten and molybdenum; manganese, silicon and carbon in amounts not over about 3% each; the remainder consisting chiefly of metal of the group iron, nickel, cobalt; the combined content of iron and nickel being not over about 20%; which method comprises depositing by fusion welding a layer of said wear-resistant alloy upon one side of a flat and relatively soft metal backing plate, grinding the wear-resistant alloy surface thus produced to form a flat and substantially smooth surface, and thereafter heating to a softening temperature the composite plate so produced, hot forming the said composite plate by plastic deformation to substantially the desired shape, and grinding the wearing or bearing surface of the structure so produced to the required dimensions.

FREDERICK T. McCURDY.